July 3, 1923.　　　　　　　　　　　　　　　　1,460,778
W. WILKIE
CAPSULE COUNTING MACHINE
Filed May 15, 1922　　　　3 Sheets-Sheet 1

Inventor
WARREN. WILKIE.

Attorney

July 3, 1923.

W. WILKIE 1,460,778

CAPSULE COUNTING MACHINE

Filed May 15, 1922   3 Sheets-Sheet 2

Inventor
WARREN. WILKIE.

By Whittemore Hulbert Whittemore Belknap

Attorneys.

July 3, 1923.

W. WILKIE

CAPSULE COUNTING MACHINE

Filed May 15, 1922

Inventor
WARREN WILKIE

Attorneys.

Patented July 3, 1923.

1,460,778

UNITED STATES PATENT OFFICE.

WARREN WILKIE, OF DETROIT, MICHIGAN, ASSIGNOR TO PARKE, DAVIS & COMPANY, OF DETROIT, MICHIGAN, A CORPORATION OF MICHIGAN.

CAPSULE-COUNTING MACHINE.

Application filed May 15, 1922. Serial No. 561,115.

*To all whom it may concern:*

Be it known that I, WARREN WILKIE, a citizen of the United States of America, residing at Detroit, in the county of Wayne and State of Michigan, have invented certain new and useful Improvements in Capsule-Counting Machines, of which the following is a specification, reference being had therein to the accompanying drawings.

The invention relates to machines for counting articles such as capsules and the like, and has for its object the provision of a simple form of machine which accurately counts the capsules and which discharges the capsules into a container or containers adapted to receive the same. Another object is the provision of a machine provided with a counting member having recesses each adapted to receive a predetermined number of capsules which are fed to the counting member in excess of the number required and the excess of which are removed. Further objects are to provide a machine in the form of a continuously moving conveyor and having means for agitating the capsules to distribute the same in their receiving recesses, and also having means for removing the excess capsules from the successive portions of the conveyor. Other objects of the invention reside in the novel features of construction and combinations and arrangements of parts as more fully hereinafter set forth.

Figure 1:
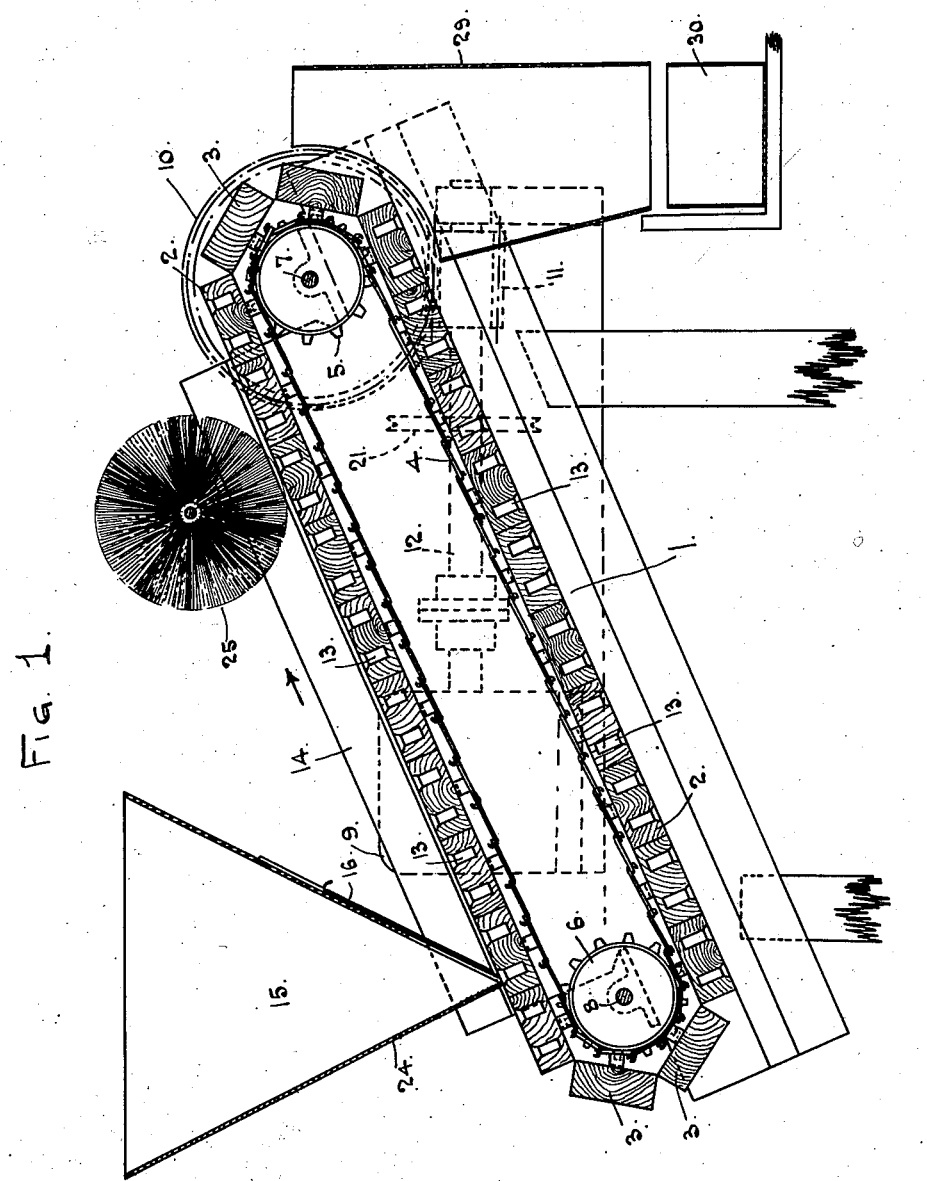
Figure 1 is a sectional elevation of a machine embodying my invention.
Figure 2:
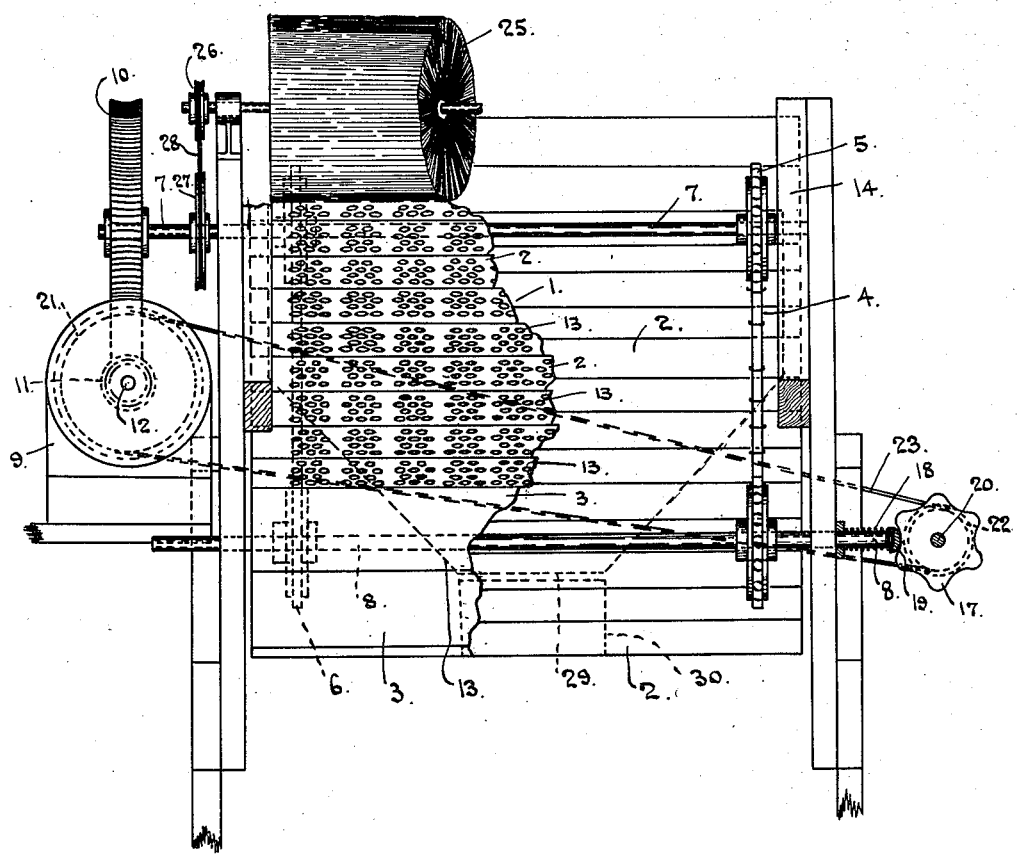
Figure 2 is an end elevation thereof with parts broken away.
Figure 3:
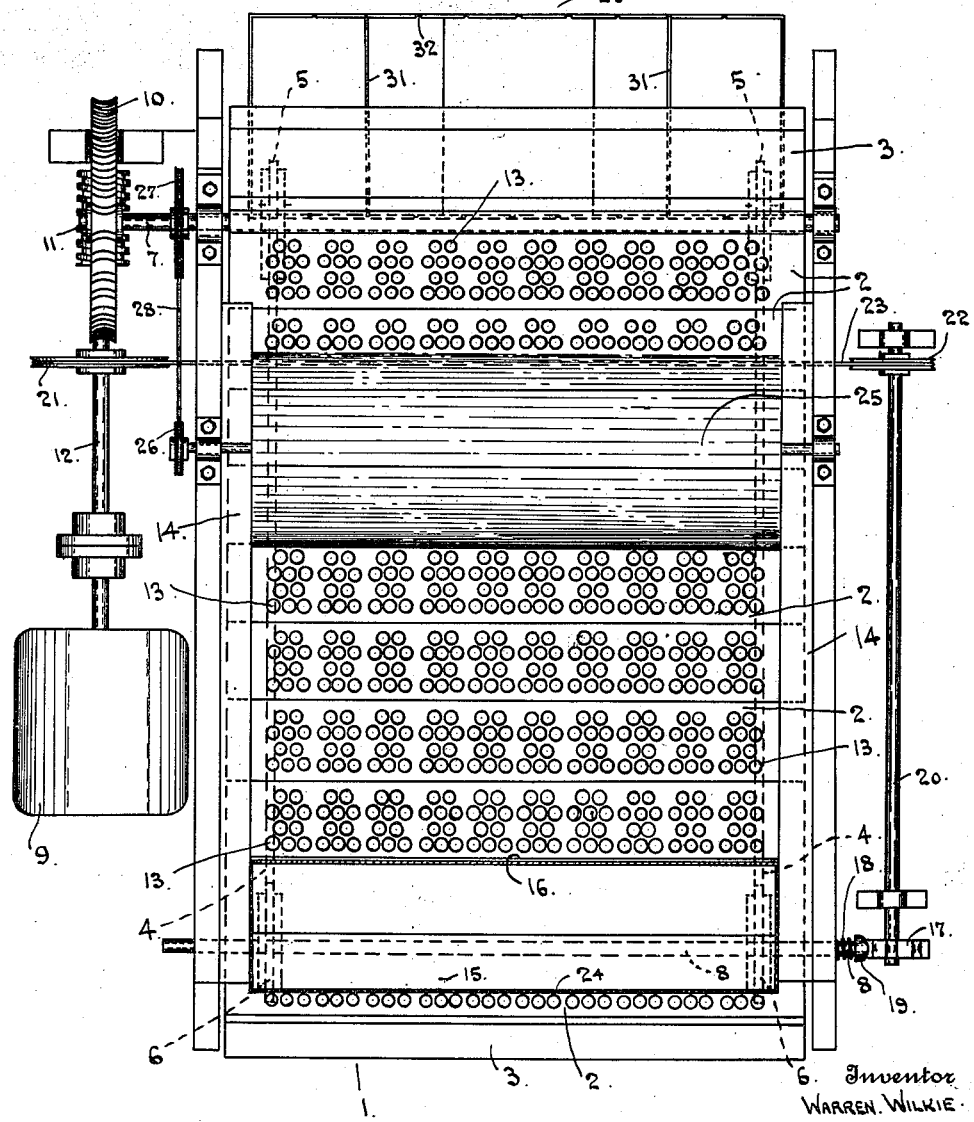
Figure 3 is a plan view thereof.

1 is the continuous conveyor of the machine comprising the alternate series of slats 2 and 3 carried upon the endless chains 4 passing over the pairs of sprocket wheels 5 and 6. These sprocket wheels are mounted upon the shafts 7 and 8 respectively which are journalled in the frame of the machine, the former being at a greater height than the latter. The conveyor is adapted to be continuously driven in the direction indicated by the arrow in Figure 1 by means of the motor 9 at one side of the machine. This driving connection comprises the worm wheel 10 upon the shaft 7 driven by the worm 11 upon the shaft 12 connected to the motor shaft.

The portions of the conveyor intermediate the end portions passing around the sprocket wheels have substantially continuous outer surfaces formed by the adjacent slats. The slats 2 are each provided with a series of longitudinally spaced groups of recesses 13 in their outer faces, each recess being adapted to receive but one capsule. The slats 3 have plain outer faces, their function being to provide a sufficient interval of time between the series of counting slats 2 to permit of the removal of a filled capsule container and its replacement by an empty capsule container. 14 are guides mounted upon the frame of the machine and extending along the sides of the upper portion of the conveyor, these guides preferably overlying the ends of the slats to prevent the capsules from falling off the container at it sides. 15 is a hopper having at the lower edge of its rear wall, an opening through which the capsules are discharged on to the upper portion of the conveyor near its lower end, a suitable closure 16 such as a sliding gate being provided for varying this discharge opening. The area, however, of the discharge opening is sufficient to provide for the feeding of capsules in excess of the number required to fill the recesses 13.

To distribute the capsules so that they will enter all of the recesses, these capsules are agitated by means of vibrating the lower end of the conveyor. In detail, the shaft 8, upon which the lower pair of sprocket wheels 6 are mounted, is longitudinally reciprocable, its movement in one direction being accomplished by means of the rotating cammed member 17 and in the opposite direction by means of the coil spring 18. A cap 19 is provided at the actuating end of the shaft to be engaged by the cams of the cammed member and also by the outer end of the coil spring. The cammed member is secured upon the shaft 20 extending longitudinally at the side of the machine opposite to the motor 9 and driven from this motor by means of the sheave 21 upon the drive shaft 12, and the sheave 22 upon the shaft 20, which latter is driven from the sheave 21 by the belt 23. With this arrangement, the slats in the lower end of the conveyor are reciprocated laterally of the conveyor so that the capsules are agitated and distributed to fill each recess in the slats in rear of the forward wall 24 of the hopper 15, this forward wall extending sufficiently close to the outer faces of the slats to prevent the escape of any capsules between its lower edge and the slat therebelow.

To remove the excess capsules, I have provided the brush 25, the bristles of which contact with the outer faces of the slats in the upper portion of the conveyor and near its upper end. This brush is driven in the direction opposite to that taken by the conveyor by means of the sheave 26 upon the shaft 7 through the belt 28. The arrangement is such that the brush does not remove any capsules located in the recesses 13, but prevents the conveyor from carrying any capsules not located in recesses upwardly beyond the brush.

29 is a suitable chute at the discharge end of the conveyor for receiving and guiding the capsules as they drop from the recesses in the slats 2 after the latter become inverted. A suitable container 30 is placed below the lower open end of this chute to receive the capsules. The chute 29 may be divided by a series of vertical partitions 31 which removably engage in vertical slots 32 in the opposite side walls of the chute and are located so that the capsules in one group of recesses 13 may be divided from the capsules located in the adjacent group of recesses. It is evident that with this arrangement, various numbers of partitions 31 may be used, and also that the chute may be divided into compartments of various sizes. With this arrangement, the number as well as the size of the capsule receiving containers will be varied.

In operation, the conveyor is continuously driven by the motor and the capsules are discharged from the hopper on to the upper portion of the conveyor in excess of the number required to fill the recesses therein. Also, these capsules are agitated and distributed by laterally reciprocating the lower end of the conveyor so that they will fill all of the recesses. If, for any reason, any excess capsules are carried upwardly by the conveyor, they are engaged by the brush which removes the same. The container or containers for receiving the capsules are moved after the last slat of the series 2 has become inverted and discharged its capsules and replaced during the interval afforded by the blank series of slats 2 so that an empty container or containers are in place to receive the capsules discharged from the first slat of the next series 2 when it becomes inverted.

From the above description, it will be readily seen that I have provided a simple construction of capsule counting machine having alternating series of counting portions and blank or non-capsule carrying portions, which latter allow sufficient time for the removal of the filled container and its replacement by an empty container. Also, that I have provided means for agitating the capsules to fill all of the capsule receiving recesses. Furthermore, that I have provided means for removing the excess capsules from the successive portions of the travelling conveyor so that only a predetermined number of the capsules is discharged into the container adapted to receive the same.

While I have specifically referred to a machine for counting capsules, it is obvious that the machine could be used for counting pills or the like.

What I claim as my invention is:

1. In a machine for counting articles, the combination with a movable member provided with a plurality of recesses, each adapted to receive a predetermined number of articles, of means for feeding the articles to said member, means for driving said member in one direction and means for laterally vibrating said member.

2. In a machine for counting articles, the combination with a movable member provided with a plurality of recesses each adapted to receive a predetermined number of articles, of means for feeding the articles to said member, and cam means for laterally vibrating said member.

3. In a machine for counting articles, the combination with a conveyor having a series of recesses each adapted to receive a predetermined number of articles, said conveyor having a portion inclined upwardly in the direction of its travel, of means for feeding the articles to said conveyor, and means for laterally reciprocating said inclined portion of said conveyor.

4. In a machine for counting articles, the combination with a conveyor having series of recesses each adapted to receive a predetermined number of articles, said conveyor having a portion inclined upwardly in the direction of its travel, of a hopper for feeding the articles to said conveyor, a cammed member for laterally moving said inclined portion of said conveyor in one direction, and yieldable means for laterally moving said inclined portion of said conveyor in the opposite direction.

5. In a machine for counting articles, the combination with a movable member provided with a plurality of recesses, each adapted to receive a predetermined number of articles, of means for feeding the articles to said member, means for driving said member and additional means for laterally vibrating said member.

6. In a machine for counting articles, the combination with a movable member provided with a plurality of recesses each adapted to receive a predetermined number of articles, of means for feeding the articles to said member, means for vibrating said member, and means for laterally removing the excess articles from successive portions of said member.

7. In a machine for counting articles, the combination with an endless conveyor comprising a series of laterally extending slats having recesses in their outer faces each adapted to receive a predetermined number of the articles, said conveyor having an upwardly inclined portion, means for feeding the articles in excess upon said conveyor, and means near the upper end of said upwardly inclined portion of said conveyor for removing the excess articles from successive portions of said conveyor.

8. In a machine for counting articles, the combination with an endless conveyor comprising alternate series of blank and apertured slats, said apertured slats being adapted to receive a predetermined number of articles, of means for feeding the articles in excess to the upper portion of said conveyor, means for distributing the articles over said conveyor, means for removing the excess articles from successive portions of said conveyor, and means at one end of said conveyor for receiving the articles carried by said article carrying portions of said conveyor.

9. In a machine for counting articles, an endless conveyor comprising alternate series of blank and apertured slats, said apertured slats having laterally spaced groups of recesses each adapted to receive a predetermined number of the articles.

10. In a machine for counting articles, the combination with an endless conveyor comprising alternate capsule carrying portions and blank portions, said capsule carrying portions having laterally spaced groups of recesses in their outer faces each adapted to receive a predetermined number of articles, of means for feeding the articles to said conveyor, and a chute at the discharge end of said conveyor adapted to be vertically divided into compartments of various sizes to separate the articles discharged from one group of recesses from the articles discharged from an adjacent group of recesses.

11. In a machine for counting articles, the combination with an endless conveyor comprising a series of slats each having groups of recesses longitudinally spaced thereof, each recess being adapted to receive a pre-determined number of articles, of means for feeding the articles to said conveyor, and a chute at the discharge end of the conveyor for receiving the capsules discharged therefrom, said chute being divisible into compartments of various sizes.

12. In a machine for counting articles, the combination with an endless conveyor, comprising a series of slats, each having groups of recesses longitudinally spaced thereof, each recess being adapted to receive a predetermined number of articles, of means for feeding the articles to said conveyor, means for removing the excess articles from successive portions of said conveyor, and means for discharging the articles in said recesses into a plurality of compartments, each compartment receiving a definite proportion of the entire number carried.

In testimony whereof I affix my signature.

WARREN WILKIE.